A     B

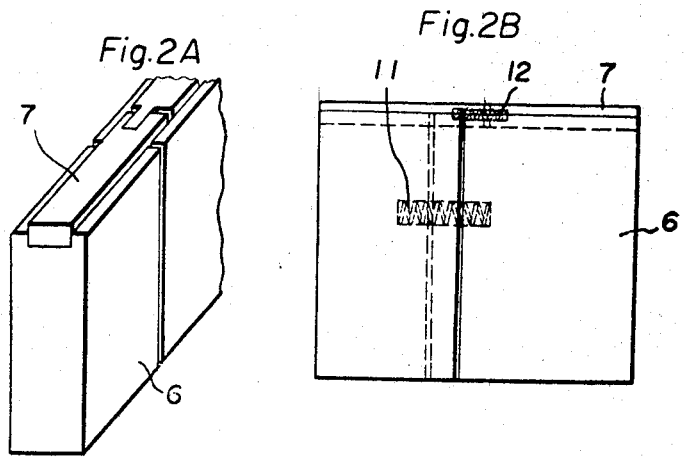
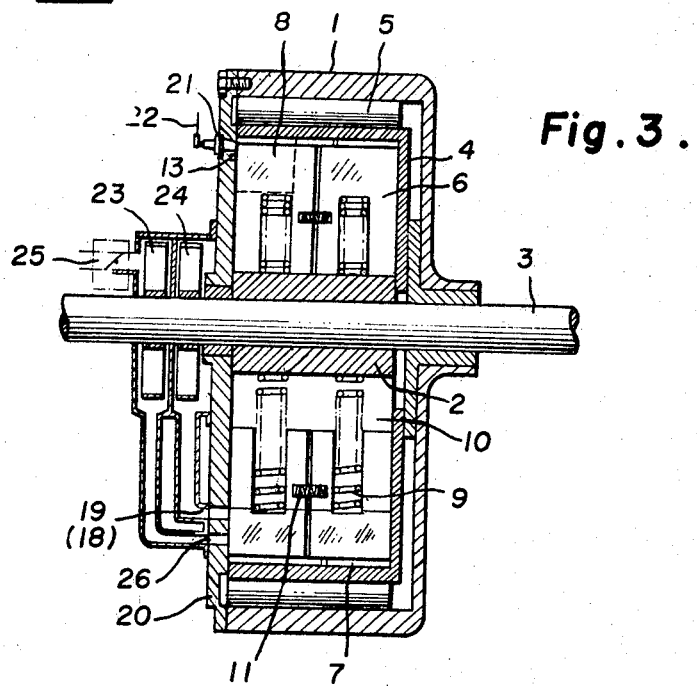

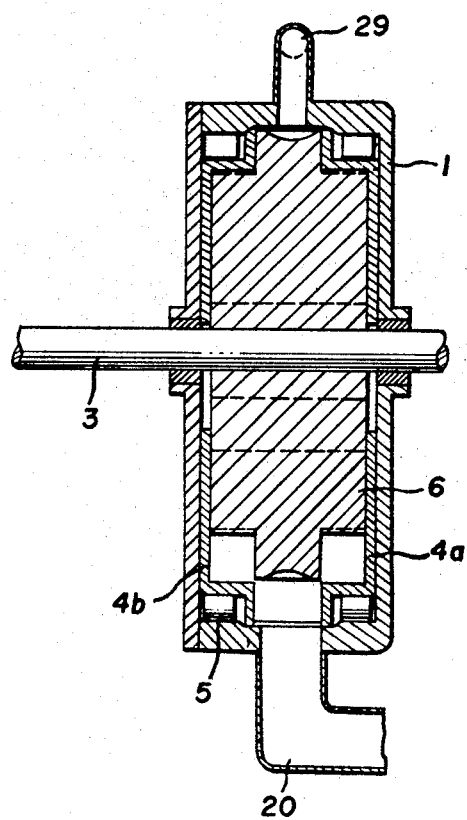
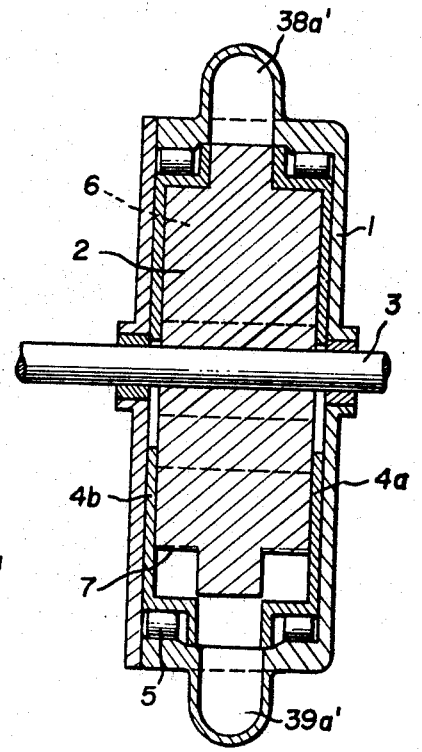
Fig. 15.
Fig. 19.

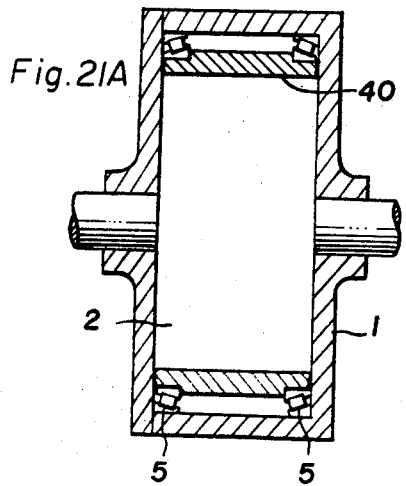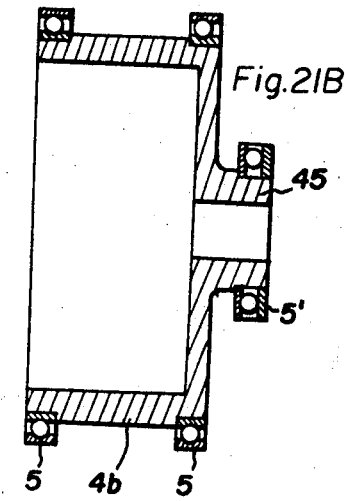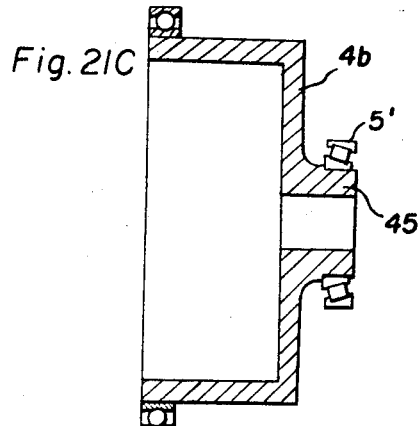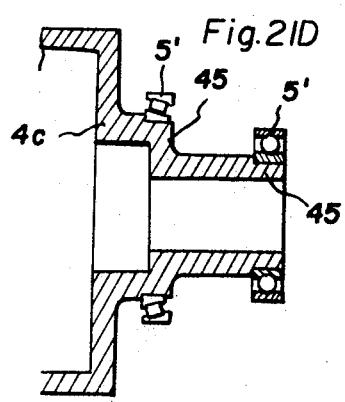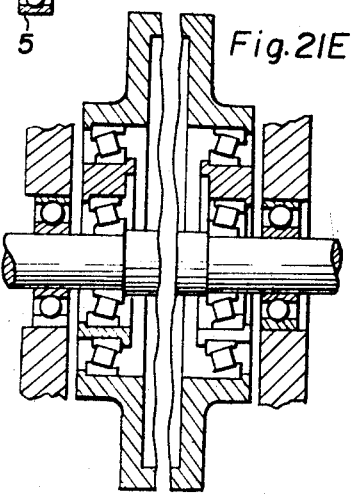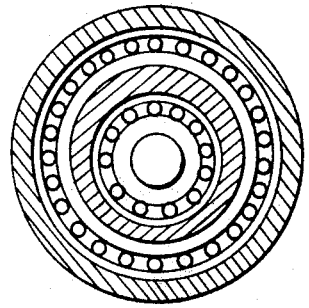

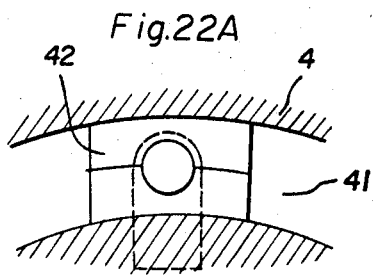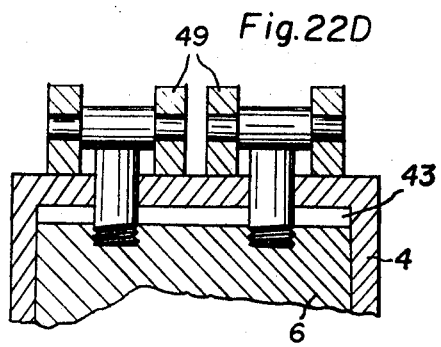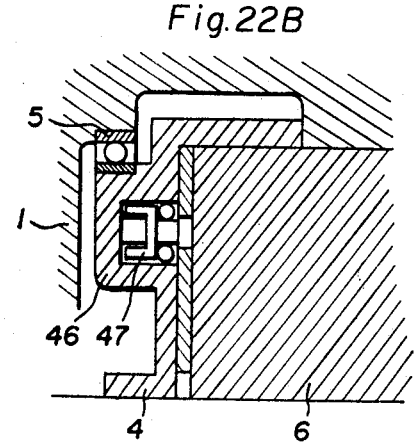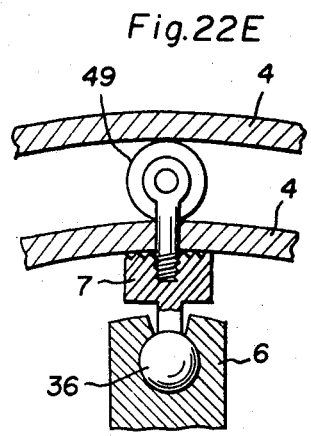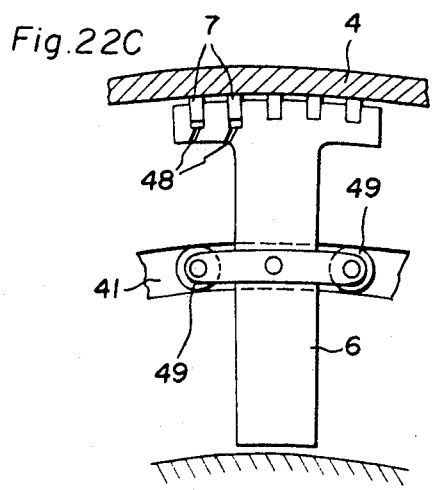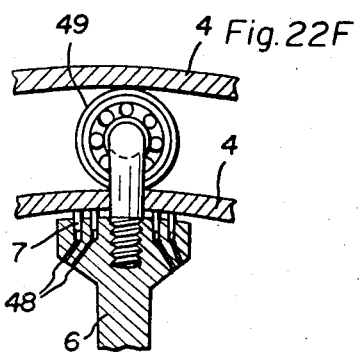

Fig. 33.
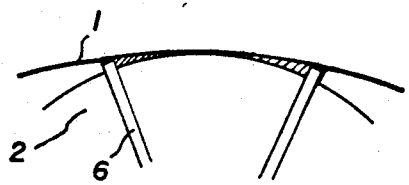
Fig. 36.
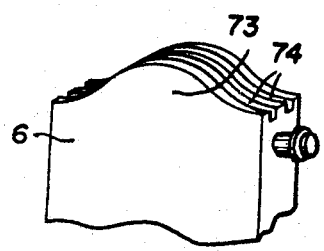
Fig. 34.
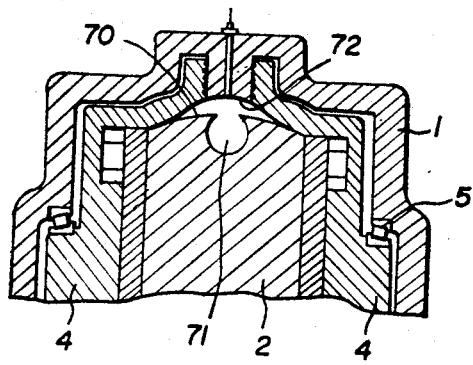
Fig. 37A
Fig. 37B
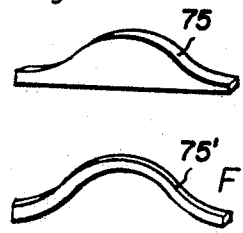
Fig. 35.
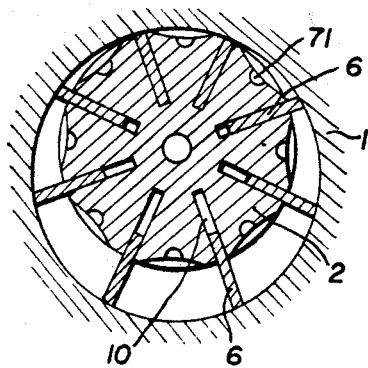
Fig. 38.
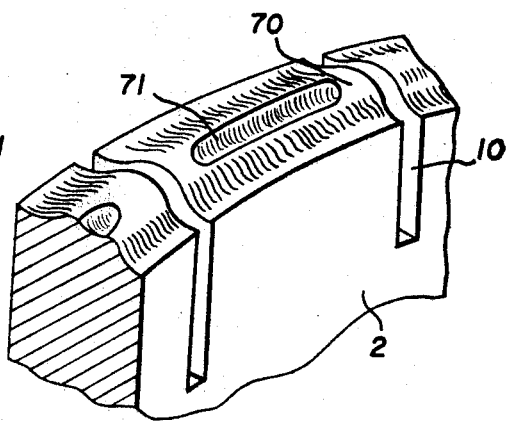

United States Patent Office 3,437,079
Patented Apr. 8, 1969

3,437,079
ROTARY MACHINE OF BLADE TYPE
Daisaku Odawara, 520, 5 Ueno Shiba-machi,
Sakai-shi, Japan
Continuation of application Ser. No. 418,473, Dec. 15, 1964. This application June 12, 1967, Ser. No. 645,551
Claims priority, application Japan, Dec. 17, 1963, 38/67,990
Int. Cl. F02b 53/00; F02m 29/00; F04c 1/00
U.S. Cl. 123—16                    19 Claims

ABSTRACT OF THE DISCLOSURE

A rotary machine of the blade type includes a plurality of blades mounted on a rotor which is eccentrically and rotatably mounted in a stationary outer casing, and working chambers which undergo periodic changes in volume as the rotor rotates. An air-tight rotor has a circumferential wall extending around the radially outer ends of the blades, and this air-tight rotor is rotatably mounted in and concentric with the outer casing, anti-friction means being disposed between the air-tight rotor and the outer casing. The radially outer ends of the blades maintain close contact with the circumferential wall of the air-tight rotor, and the latter has at least one diametrically extending side wall engaged with the rotor which mounts the blades. The working chambers are defined by the rotor mounting the blades, the air-tight rotor and the outer casing.

Summary of the invention

This application is a continuation of Ser. No. 418,473, filed Dec. 15, 1964, and now abandoned.

This invention relates to a rotary machine which is capable of high speed rotation and which is provided with complete airtight seal against high pressure applied thereto, and more particularly to a rotary machine of the blade type which can be utilized as a rotary pump, a rotary compressor, a rotary internal combustion engine and the like which use a fluid as a medium.

In the conventional rotating mechanism of the blade type, there are provided radially in the rotor grooves in which blades are slidably inserted, or resilient blades are provided in the rotor, the front ends of said blades being caused to bear against the inner surface of an outer casing by the biasing force of springs or by the centrifugal force developed by the rotation of said blades and the volume of an actuation chamber defined by two blades as well as by rotor and outer casing being caused to change by the arrangement in which the center of rotor deviates from the center of outer casing, thereby actuating the mechanism. It has often happened with the rotary machines of this type that, since the front ends of blades are brought to bear against the outer casing by the biasing force of springs or a centrifugal force, the speed at which the front ends of blades rotate relative to the outer casing and the force which urges said front ends of blades toward said casing increase as the rotor is rotated at a higher speed, with the result that the front ends of blades undergo wear in a short space of time and airtight seal of the actuation chamber is impaired.

The present invention contemplates the elimination of the aforementioned fault of conventional rotary engines of the blade type by providing an airtight rotor which keeps contact with a fixed outer casing through antifriction means and is mounted concentric with said outer casing. This airtight rotor may be in the form of a cylinder or a pail having one side wall, or may consist of two members divided into the right and left portions, each having one side wall.

Other objects and features of this invention will be evident from the accompanying drawings wherein:

FIG. 2A is a perspective view of a blade embodying the invention;

FIG. 2B is a side elevation view of a blade embodying the invention;

FIG. 3 is a view in axial section of a machine of the electric ignition style (Otto-cycle);

FIG. 15 is a view similar to FIG. 14 but in another diametric plane;

FIGS. 16 to 19 are diametric sectional views showing various embodiments of this invention used as a rotary pump, a rotary motor and the like which are driven by a non-compressible and a compressible fluid;

FIGS. 21A through 21D are axial sectional views illustrating rotor supporting means in accordance with the invention;

FIG. 21E is an axial sectional view illustrating a further form of rotor support mechanism in accordance with the invention;

FIG. 21F is a diametric sectional view corresponding to FIG. 21E;

FIGS. 22A to 22F show various examples of a blade mounting device;

FIG. 33 is a view in explanation of the state prevailing in the working chamber at the time of compression of a conventional rotary machine of the blade type;

FIG. 34 is a diametric sectional view of an internal combustion engine incorporating the features of this invention in which the outer circumferential surface of a rotor is a convex surface and the internal circumferential surfaces of an outer casing and an airtight rotor are concave surfaces;

FIG. 35 is a diagrammatic view of the engine shown in FIG. 34;

FIG. 36 is a perspective view of the front end of a blade according to this invention;

FIGS. 37A and 37B are perspective views of the packings fitted to the front end of the blade of FIG. 36;

FIG. 38 is a fragmentary perspective view of the outer circumferential surface of a rotor provided by this invention.

In the drawings, like reference characters designate similar parts in the several figures.

Figure 1:
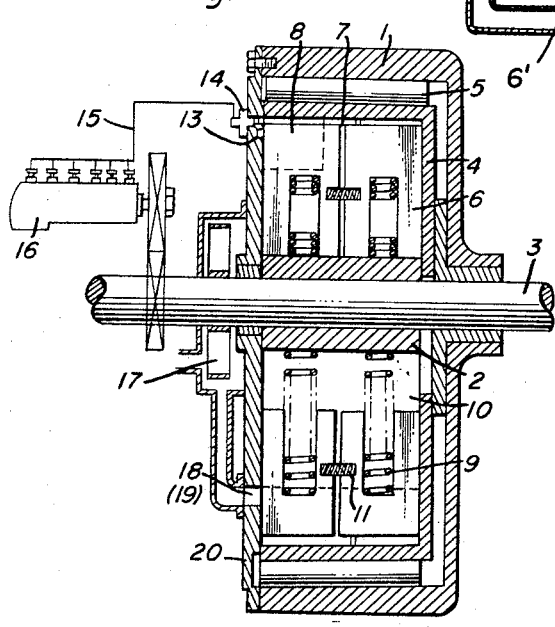
FIG. 1 is a view in axial section of a rotary blade machine of the diesel type constructed according to this invention.

In FIG. 1, a rotor shaft 3 is positioned eccentric to an outer casing 1 and a pail-shaped airtight rotor 4, with a rotor 2 being mounted on this shaft concentric therewith. There are blades 6 inserted in said rotor 2 and positioned radially and at predetermined intervals, each of said blades 6 consisting of two members which are positioned side by side in a row. The two members of a blade are joined together by fitting the protrusion in one member to the mating depression in the other member, and there is provided in the middle of these two members a transverse hole in which is positioned a spring 11 which urges two members of a blade outwardly. There is provided in the front end of a blade a groove in which a blade packing 7 is fitted. Each of the blades 6 has in the inside thereof another spring 9 which is adapted to urge the blade in the radial direction.

There is provided a recess 8 in which combustion takes place (hereinafter to be referred to as a combustion chamber) along the outer circumferential surface of the rotor 2 equipped with blades 6 having the aforementioned construction, the fuel injected through nozzles being burned in said combustion recess.

Said airtight rotor 4 is positioned such that it provides complete airtight seal to said rotor 2 and blades 6 in the outer casing 1, and there are numerous rollers 5 disposed between its external circumferential surface and the casing 1. 20 is a cover for casing which has a nozzle 14 mounted in one point thereof, with a bypass 13 being provided adjacent thereto. This bypass 13 is a passage formed in the inner surface of the cover 20 for connecting one combustion chamber with the next combustion chamber when one combustion chamber 8 is brought into alignment with the nozzle 14. In other part of the cover 20 are provided an inlet port and an exhaust port 18, 19, with the former 18 being connected through a pipe to a compression device 17 and to atmosphere. 15 is a fuel pipe, and 16 is a fuel pump.

Figure 4:
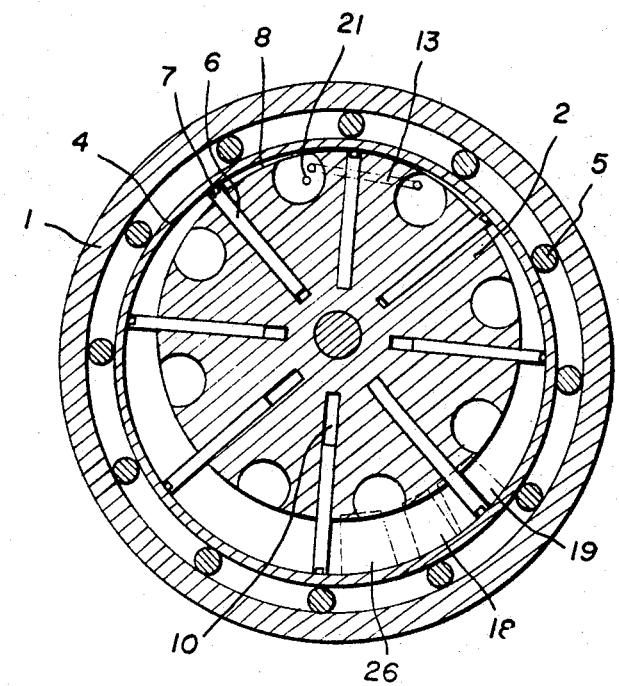
FIG. 4 is a central diametric sectional view of FIG. 3.

In operation, the rotation of rotor 2 in the clockwise direction in FIG. 4 causes airtight rotor 4 to rotate therewith, with rollers 5 rollingly rotating on the inner surface of casing 1, so that blades 6 slides along the inner surface of airtight rotor 4 while maintaining airtight seal therewith. Since rotor 2 is positioned eccentrically as described previously, airtight rotor 4, blades 6 and rotor 2 are so related with one another that the upper portion of rotor 2 keeps close contact with airtight rotor 4, while there is a predetermined clearance formed between the lower portion thereof and airtight rotor 4, so that blades 6 in the upper portion of rotor 2 are drawn into the grooves formed in the rotor 2 against the biasing force of springs 9 to come to the same level as the circumferential surface of rotor 2, sticking out gradually as said clearance grows in size. Blades 6 slide in the blade grooves 10 at all times, keeping close contact with the inner circumferential surface of airtight rotor 4. Consequently, the rotation of rotor 2 in the clockwise direction results in the invasion into a space between blades 6 of the air suctioned through inlet port 18, said space becoming narrower as it approaches the position of nozzle 14 and the air therein being compressed. When said space is brought into alignment with nozzle 14, it ceases to exist and the air is in the combustion chamber 8 where it is mixed with an injected fuel to be burned and exploded. At the same time as the fuel is injected, burning fuel is injected into a combustion chamber 8 through bypass 13 from the combution chamber located next beyond said chamber in the direction of rotation where explosion is under way, such injection occurring at a time most favorable for the combustion of fuel to help stir the mixture of air and fuel to burn.

At the time the device is operated as aforementioned, inlet and exhaust ports are so arranged that the inlet port of compression device 17 is indexed with exhaust port in one actuation chamber so that exhaust may be vented completely, with inlet port being opened in order to suction air as much as possible.

The above arrangement is intended for super-charging the machine, and it can be dispensed with when super-charging is not required. When it is desired that the engine can be accelerated suddenly or can be equal to a sudden change in the load applied, there may be provided, as shown in FIG. 3, a compression device 23, 24 and a carbureter 25 which are coupled to the governor controlling a fuel pump 16 so that the combustion by compression ignition may be facilitated.

Description has so far been made on the engine of diesel type. Now the engine of electric ignition type (Otto-cycle) will be explained with reference to FIG. 3. Fundamental principles of the engine of this type are the same as the engine of diesel type shown in FIG. 1 except that there are provided a spark plug 21 instead of a nozzle 14, a scavenging compression device 24 and air compression device 23 are provided separately, a separate exhaust port 19 and an air inlet port 26 are provided, and a carbureter 25 is mounted on the air compression device 23. The engine works in the same manner as the engine shown in FIG. 1. The ignition of the engine will now be explained.

An air fuel mixture is supplied from carbureter 25 to a space between blades 6 through air compression device 23 and air inlet port 26, the gas being compressed and delivered to the position of spark plug 21 to be ignited. When a compressed combustion chamber has passed by the sinister end of bypass 13 as seen in FIG. 4, the flame is injected through bypass 13 into said compressed combustion chamber from the burning combustion chamber located next beyond said chamber, the gas in the former being ignited. Communication is maintained between the two chambers until the sinister end of the latter has passed by the dexter end of bypass 13, when both dexter and sinister ends of bypass are within the same chamber, so that there is no delivery of flames.

An exhaust gas is forcedly vented through exhaust port 19 by compression device 24. This compression device 24 for forced exhaust is not essential, but is of use when the engine is equipped with a supercharger. When the engine of electric ignition type is equipped with a supercharger, the air taken in through inlet port is an air fuel mixture and it is impossible to provide direct communication between inlet and exhaust ports. The provision of a scavenging compression device 24 makes it possible to supply a fresh air after exhaust gas has been vented through exhaust port 19 by back pressure, so that an air fuel mixture delivered through air inlet port 26 is not ignited by exhaust gas.

Blades 6 are shown in the embodiment illustrated as disposed radially at right angles to a shaft 3. In this arrangement, front ends of blades are liable to wear rapidly because they are pressed hard against airtight rotor 4 by a centrifugal force when said blades are rotated at high speed. This may be prevented by arranging such that blades 6 are positioned radially at an angle of about 45 degrees with respect to shaft 3 so that the projection due to a centrifugal force may be controlled and frictional dragging may be minimized. It is to be understood that the angle is not limited to 45 degrees according to this invention.

Particular embodiments of this invention have been shown and described. According to this invention, each of the blades 6 is adapted to be urged in the centrifugal direction by a spring 9 and is made up of two portions which are urged to the opposing lateral directions by a spring 11, with a packing member being fitted to the front end of said blade in such a manner that it maintains close contact with the contact surface. This arrangement enables the blade to keep close contact with airtight rotor 4, with airtight seal being provided there between with little friction.

The arrangement that airtight rotor 4 is pail-shaped ensures that airtight seal is positively provided when air is expanded and compressed for explosion.

The provision of rollers 5 between airtight rotor 4 and outer casing 1 makes it possible to minimize friction and rotational loss.

The provision of bypass 13 facilitates combustion by compression ignition.

These features coupled with improved means for air supply, exhaust and supply or mixed air make this engine efficient in operation, simple in form, and economical to manufacture.

Figure 5A:
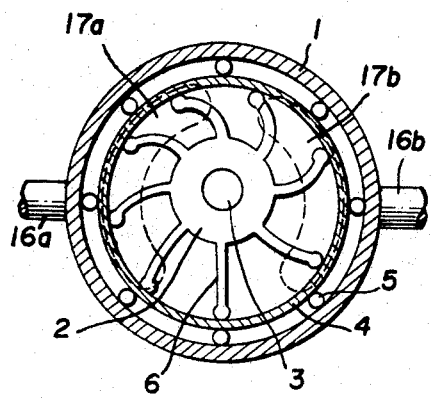
FIGS. 5A and 5B are diametric sectional views of a rotary machine of the blade type including deflectable blades.

This invention may be applied to a rotary machine having blades made of a resilient material, such as pump, compressor and the like. In FIG. 5A, a number of blades 6 made of resilient material are positioned eccentric to rotary shaft 3 in an airtight rotor 4 and blades 6 are arranged such that the front ends thereof keep close contact with the inner surface of said airtight rotor 4. 16a and 16b are fluid inlet and discharge pipes respectively, and 17a and 17b are inlet and discharge ports respectively. The rotation of blades 6 will, therefore, result in the blades 6 becoming deflected, the space between blades undergoing a change in volume according to the amount of eccentricity of said blades relative to airtight rotor 4.

Figure 5B:
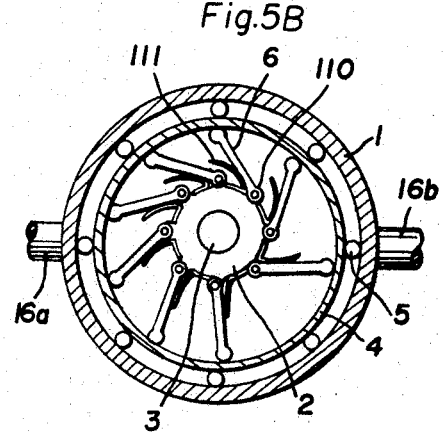
Figure 6A:
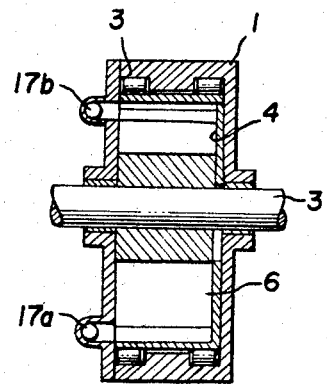
FIGS. 6A and 6B are axial sectional views corresponding, respectively, to FIGS. 5A and 5B.
Figure 6B:
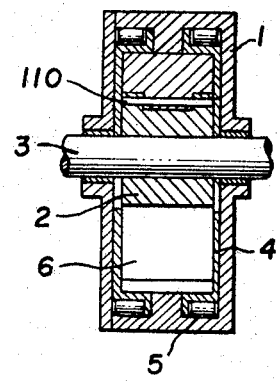

In FIG. 5B, the arrangement of outer casing 1 and airtight rotor 4 as well as antifriction means 5 disposed therebetween is the same as the arrangement shown in FIG. 5A, except that the blade mechanism in the airtight rotor 4 is constructed as follows to accomplish the objects of the invention: a number of blades 6 are rotatably mounted by pins 110 on a rotor 2 carried by a rotary shaft 3 disposed eccentric to airtight rotor 4, each of said blades 6 being urged in the direction of its rotation by means of a resilient member 111. Consequently, as rotor 2 rotates, blades 6 gradually undergo deformation centering on pins 110 against the biasing force of resilient members 111 according to the amount of eccentricity relative to airtight rotor 4, so that the spaces between blades undergo a change in volume.

As described in the foregoing description, this invention provides a mechanism in which antifriction means are interposed between outer casing 1 and airtight rotor 4 mounted in said casing, blades are mounted eccentrically in said airtight rotor in such a manner that the front ends thereof keep close contact with said airtight rotor 4, and the spaces between vanes are subjected to a change in volume due to the deflection or deformation of blades. It will be understood, therefore, that the rotation of airtight rotor 4 which maintains a difference in the number of revolution relative to outer casing 1 minimizes the fractional dragging of the front ends of blades against airtight rotor 4. This eliminates the wear and damage due to burning of the front ends of blades and prolongs the life of blades. This also makes blades 6 more tenacious than otherwise so that airtight seal may be provided while the blades are rotated at a high speed.

The mechanism wherein, as described hereinabove, blades are positioned eccentrically in the airtight rotor and undergo deformation as they rotate makes it possible to provide inlet and discharge ports 17a, 17b substantially in the middle of the rotor, so that the engine works efficiently even when pressure is applied to discharge port, inlet port or blades with blades rotating smoothly without being subjected to a shocking impact as in engines of the conventional type.

Figure 7:
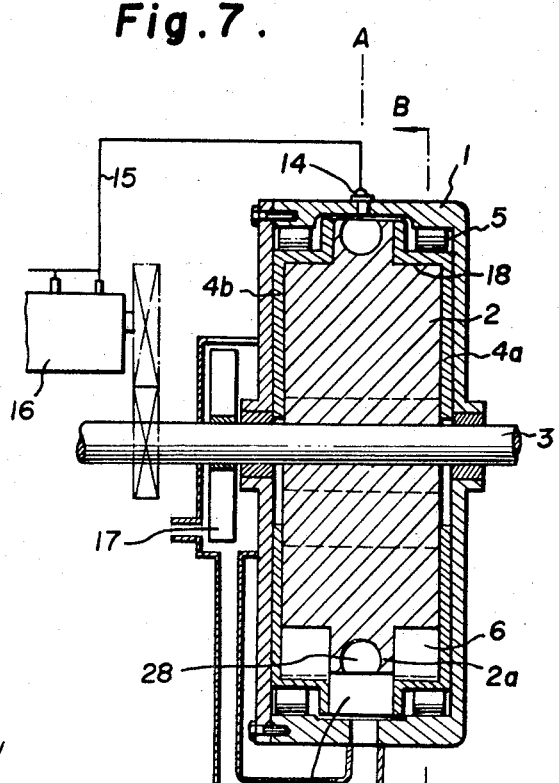
FIG. 7 is an axial sectional view of a rotary machine of the blade type comprising an airtight rotor according to this invention which is divided into right and left portions, each part having one side surface.

In FIG. 7, an airtight rotor 4 having lateral surfaces and divided into two members 4a, 4b on the right and left are mounted along the outer circumferential surface in such a manner that they embrace a rotor 2 on the right and left sides thereof and keep close contact therewith. These two members of airtight rotor 4a, 4b are concentric with the outer casing 1, so that the former keep contact with the rotor 2 in one circumferential end, but there is a clearance in the diametrically opposed circumferential end. Between the shoulder 18 of each airtight rotor and the inner circumferential surface of outer casing 1 is provided antifriction means such as rollers 5 rotatably mounted therebetween. Combustion chambers 28 properly spaced from one another are provided in the projection formed on the circumferential surface of aforementioned rotor 2. Blades 6 are mounted such that they are disposed radially with a rotary shaft 3 in the center and straddle each of said combustion chambers 28.

Figure 8A:
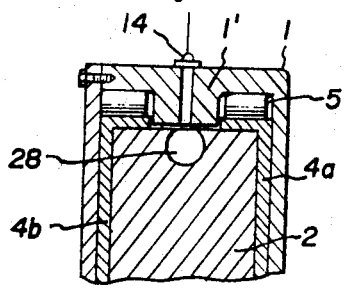
FIGS. 8A and 8B are fragmentary sectional views of a fuel injection chamber and a combustion chamber, respectively, of another embodiment of this invention.
Figure 8B:
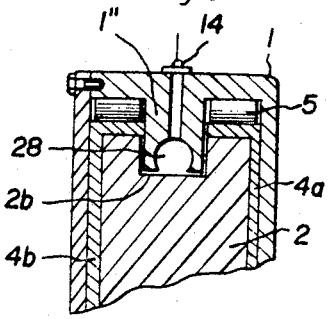
Figure 9:
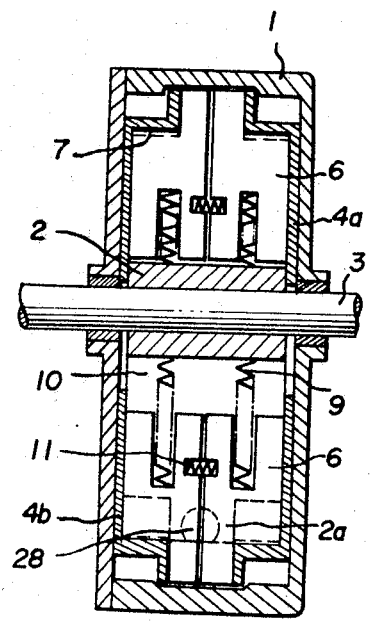
FIG. 9 is a view in section taken on the line C—C of FIG. 10.
Figure 10:
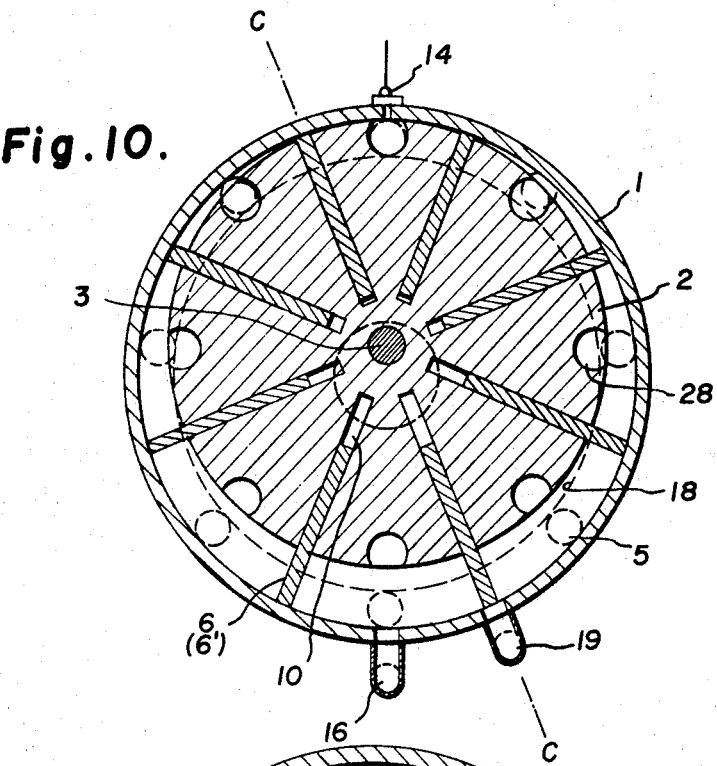
FIG. 10 is a view in section taken on the line A—A of FIG. 7.
Figure 11:
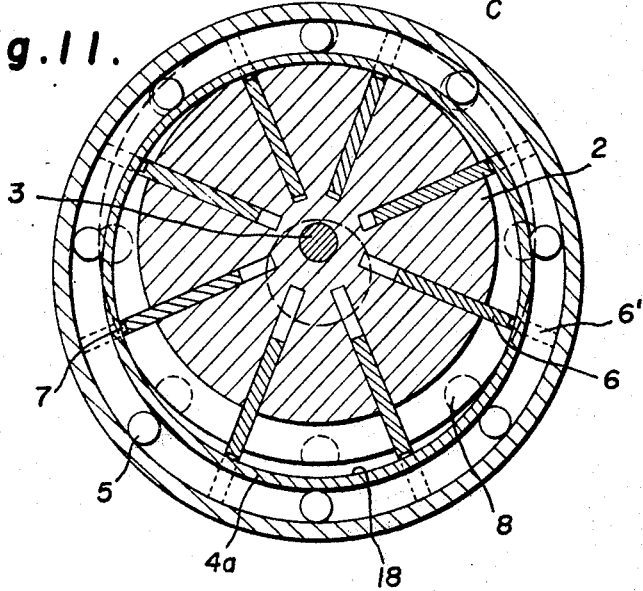
FIG. 11 is a view in section taken on the line B—B of FIG. 7.
Figure 12:
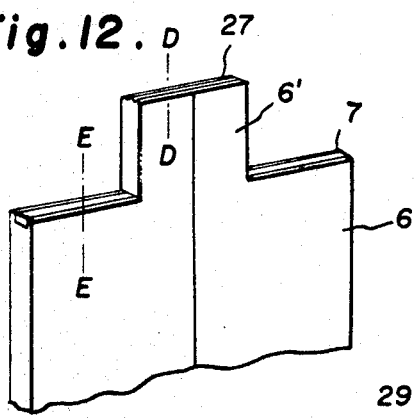
FIG. 12 is a perspective view of the front end portion of a blade.
Figure 13:
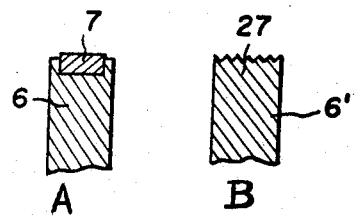
FIG. 13A is a view in section taken on the line E—E of FIG. 12.
FIG. 13B is a view in section taken on the line D—D of FIG. 12.

The circumferential portion 2a of rotor 2 where combustion chambers 28 are located keeps direct contact with the inner circumferential surface of outer casing 1, while the remainder of the rotor 2, i.e., the lateral portions on the right and left, is surrounded and closely contacted by the two members of airtight rotor 4a, 4b. The projection 6' in the center of each of a number of blades 6 mounted radially in the rotor 2 keeps contact with the inner circumferential surface of outer casing 1, while the lateral portions thereof on the right and left keep contact with the inner surfaces of the two members of airtight rotor 4a, 4b respectively, so that airtight seal is provided in the space defined by outer casing 1, the two members of airtight rotor 4a, 4b, rotor 2 and blades 6. Each of said blades 6 has on the end surface thereof a labyrinth 27, with a blade packing band 27 being mounted on the opposite end surfaces on the right and left. As shown in FIG. 9, there are provided two springs in each of the blades, one being a compression spring 11 positioned in the center of a blade 6 for urging the blade divided into two portions in the transverse direction, and the other is a spring 9 biasing a blade 6 in the centrifugal direction or in the direction of movement of said blade, with the result that the blades 6 are adapted to bear against the airtight rotors 4a, 4b at all times. There is provided a nozzle 14 which is mounted on the outer casing 1 at a point where a combustion chamber 28 of the rotor 2 journalled eccentrically with respect to said outer casing comes into contact with the inner circumferential surface of the casing. There is also provided a pipe 15 connecting said nozzle with a fuel pump 16. Air is led into the engine by means of a compression device 17. There is provided an exhaust port 19. In the embodiment explained hereinabove, there are provided combustion chambers 28 in the projections formed in the middle of the rotor 2. The present invention is not, however, to be construed to be limited by this arrangement. The arrangements shown in FIGS. 8A and 8B will have the same effect. In FIG. 8A, the circumferential surface of the rotor 2 where combustion chambers 28 are positioned is flat, and the portion 1' of outer casing which keeps contact with the circumferential surface of rotor projects inwardly. In FIG. 8B, there are recesses 2b in the circumferential surface of rotor 2 which are adapted to receive therein the projections 1" formed in circumferential surface of outer casing 1, one or more combustion chambers 28 being positioned in said projection. In the arrangements shown in FIGS. 8A and 8B, other principal structures are the same as described earlier in the above description except that the blades 6 have a form which is in conformity with the form of surface with which it is adapted to keep contact. The manner of operation of an embodiment of this invention follows from the structure described. In FIG. 10, rotor 2 rotates in the clockwise direction with rotary shaft 3. As rotor 2 rotates, the blades disposed radially in the grooves project from said grooves along the two members of airtight rotor 4a, 4b and outer casing in the centrifugal direction owing to the biasing force of springs 9 and a centrifugal force, and then drawn into said grooves against said biasing force and centrifugal force. The two members of airtight rotor 4a, 4b rotating with rotor 2 rotate smoothly relative to outer casing by the virtue of antifriction means such as rollers 5 disposed therebetween.

The air delivered by means of a compression device 17 to a space between rotor 2 and outer casing 1 is suctioned through a pipe into clearances between blades. The air thus suctioned is compressed in said clearances between blades which grow smaller in size as rotor 2 rotates. Since rotor 2 is disposed eccentric to outer casing 1, the clearance between blades in which air has just been suctioned has a largest value, so that the space defined by rotor 2 and outer casing 1 grows smaller in size and most of the compressed air is in the combustion chamber 28 when said space has reached the point in the outer casing at which rotor 2 comes into contact with outer casing 2.

Consequently, when said combustion chamber 28 comes into contact with outer casing 1 to be compressed to the highest degree, fuel is injected into said chamber by means of a synchronized associated mechanism, so that combustion explosion cycle is started. The energy developed by said explosion is delivered to blades, developing a powerful driving force. The spaces positioned between blades successively operates in the manner described above.

According to this invention, combustion spaces including combustion chambers 28 having a rotor 2 disposed eccentrically in the outer casing 1 and blades 6 mounted radially thereto are embraced by airtight rotors 4a, 4b, and airtight seal is provided to said spaces by blades 6 which bear against airtight rotors 4a, 4b in three directions by virtue of the biasing force of springs. Blade packing bands 7 mounted on the front ends of two shoulders of blades which come into contact with the circumferential surface of airtight rotors 4a, 4b to maintain close contact with said circumferential surface and to provide airtight seal. On the front end of each of the blades 6 which comes into contact with outer casing is mounted a labyrinth 27 which is so constructed that airtight seal is provided to combustion spaces which are disposed adjacent to one another and the leakage of pressure to the adjacent chamber is prevented.

The arrangement that airtight seal is formed in two portions which embrace rotor on the opposite sides thereof makes it possible to provide combustion chambers on the outer circumferential surface of the rotor and to mount a fuel supply device on that side of outer circumferential surface of outer casing which is adjacent to said combustion chambers, so that a parallel multicylinder engine small in size but capable of developing a high power can be provided.

Figure 14:
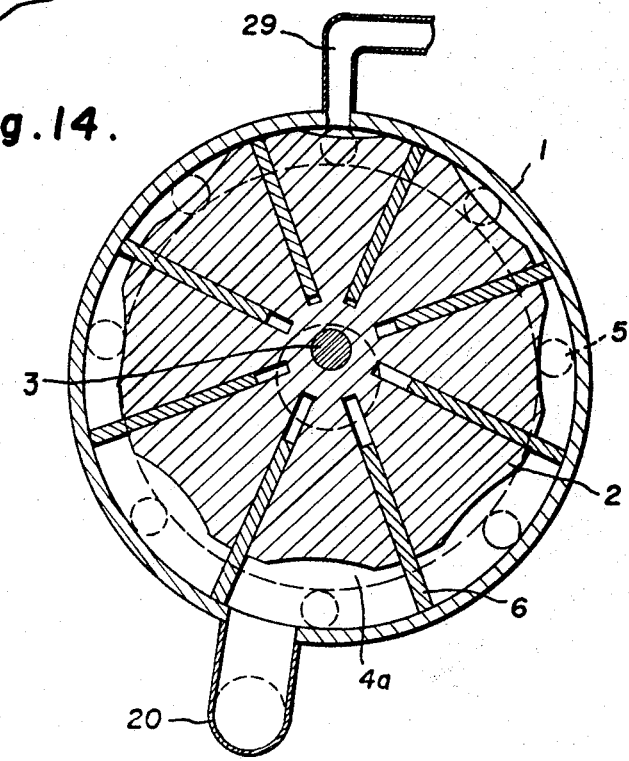
FIG. 14 is a central diametric sectional view of a rotary machine of the blade type according to this invention used as a motor adapted to be driven by steam.

The foregoing descriptions sets forth certain illustrative embodiments of the invention taking the form of diesel engines, but the principles of the invention may be incorporated in many other ways as, for example, in engines of the electric ignition type. In FIGS. 14 and 15 is shown a steam driven engine which is constructed according to the principles of this invention. This engine is exactly the same as the aforementioned engine of the diesel type in principle except that combustion chambers positioned in the rotor or outer casing are dispensed with because they are not required and that a steam inlet port 29 and an exhaust port 20 are provided in the outer casing. This arrangement provides a steam driven rotary engine which operates at a high efficiency. It is possible to recover from the exhaust port 20 that portion of steam which contains a principal residual energy.

The rotary machine of the blade type incorporating the principles of this invention may be in the form a reversible rotary motor driven by a non-compressible or a compressible fluid, or a rotary pump and a compressor which deliver by pressure a non-compressible or a compressible fluid.

Figure 16:
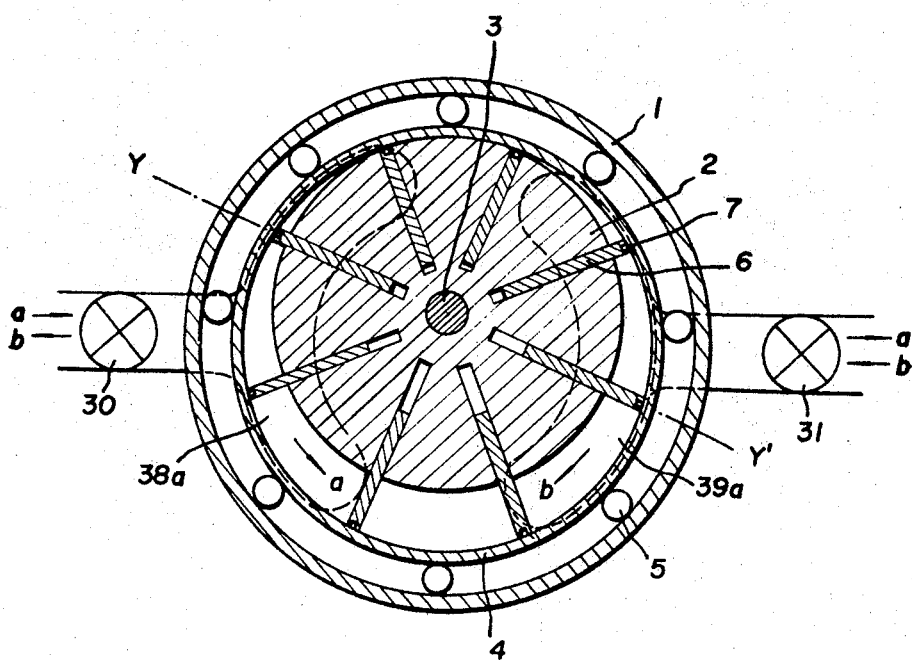

In FIG. 16, a fluid inlet and exhaust port 38a and a fluid inlet and exhaust port 39a are formed as widely as possible in the front and rear of outer casing 1 on the side wall thereof, and a two-way cock 30, 31 which opens and closes synchronously is mounted between these ports.

Figure 17:
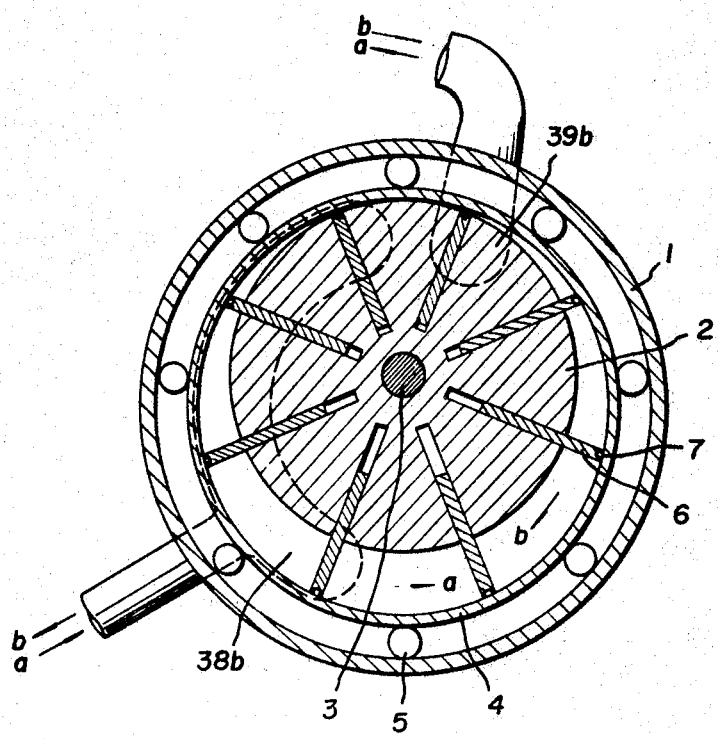
Figure 18:
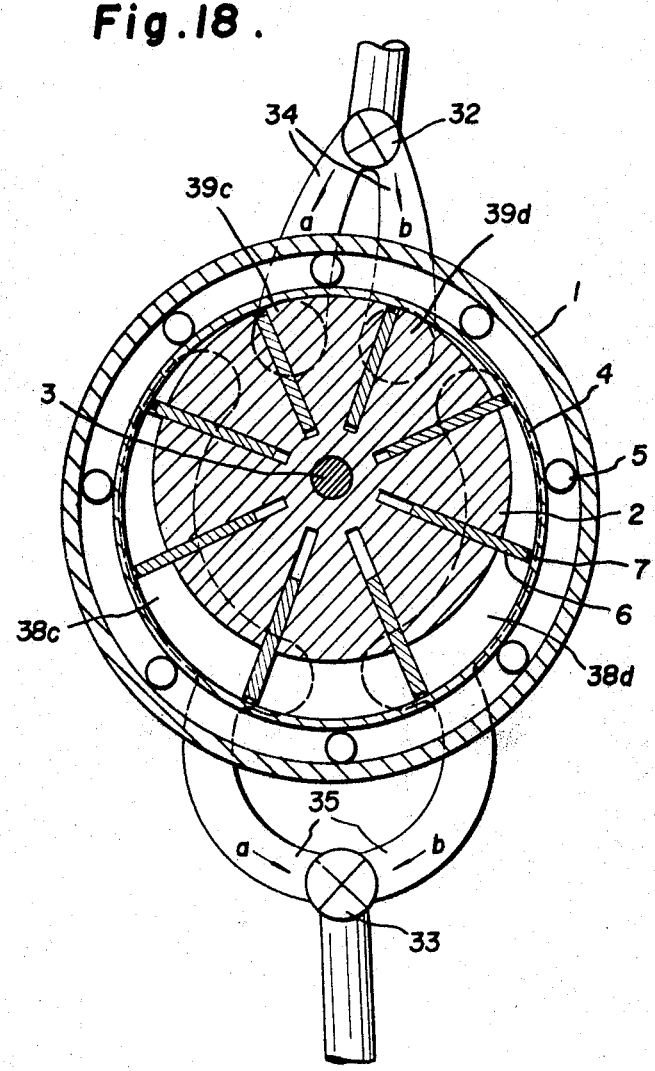

The embodiment shown in FIG. 17 has a wide fluid inlet and exhaust port 38b on one side and a narrow inlet and exhaust port 39b on the other side. In FIG. 18, wide inlet and exhaust ports 38c, 38d are positioned exactly in the same manner as in FIG. 17, and are connected by connecting pipes 35 with a three-way cock 33.

There are also provided narrow exhaust ports 39c, 39d which are also connected by connecting pipes 34 with a three-way cock 32.

The operation of the machine as a pump will be explained with reference to FIG. 16. A rotary shaft 3 is rotated in the anticlockwise direction, i.e. in the direction of an arrow a. The concomitant rotation of a rotor 2 causes blades 6 to slide inside the airtight rotor 4 which also rotates because there is provided antifriction means such as rollers 5 interposed between the inner circumferential surface of outer casing 1 and said airtight rotor 4.

The aforementioned rotation causes a non-compressible fluid supplied through cock 30 to be led into spaces between blades through port 38a which acts as an inlet port. When the space between blades is maximized in volume, i.e. a space has come to a position directly the perpendicular in the drawing, said space is out of index with inlet port 38a, so that the incoming of fluid ceases and the compression of fluid starts. As soon as the compression phase sets in, port 39a which serves as an exhaust port indexes with the space, with the incoming fluid being discharged through cock 31.

When the embodiment shown in FIG. 16 is used as a rotary motor driven by a non-compressible fluid, a non-compressible fluid is led through port 39a which serves as an inlet port under pressure into spaces between blades, these spaces are filled with fluid, and pressure is applied to said fluid, so that the difference in the length of blades causes rotary shaft 3 to be rotated in the direction of an arrow b. Since the fluid is non-compressible, non-compressible fluid of the same pressure is supplied through inlet port 39a as its volume changes. When a space between blades has been maximized in volume as aforementioned, the supply through said port 39a ceases, with the fluid being at once relieved of pressure and the space being communicated with port 38a which serves as an exhaust port in accordance with the rotation in the direction of an arrow b and before being influenced by a decrease in volume. Thus, the fluid is discharged as the space between blades shows a change in volume. The operation of an embodiment of this invention which is used as a rotary compressor using a compressible fluid as a medium will now be explained with reference to FIG. 17. Since the fluid used is compressible, the fluid that has been delivered undergoes compression and expansion, so that one port 39b may be smaller than the other port as illustrated. In this instance, rotor 2 is rotated in the direction of an arrow a, and the incoming of fluid is blocked when the fluid delivered through inlet port 38b into a space between blades has been maximized in volume, The fluid in a space between blades and defined by rotor 2 and airtight rotor 4 is gradually compressed as said space is reduced in volume as a result of the rotation 2, and discharged after it has reached a predetermined pressure through exhaust port 39b which is indexed with said space. When this embodiment is used as a rotary motor, a compressible fluid is led through port 39b which serves as an inlet port into spaces between blades, and rotor 2 is rotated in the direction of an arrow b.

Even if the supply of fluid is blocked, the expansion energy of fluid causes rotor 2 to rotate continuously, with the fluid being discharged through port 38b which serves as an exhaust port which is indexed with a space between blades when it has been maximized in volume. Thus the power is continuously developed so long as a fluid is delivered through inlet port 39b.

The embodiment shown in FIG. 18 is a reversible mechanism. It is provided with two sets of inlet and exhaust ports 38c, 38d and 39c, 39d on which synchronously operated three-way cocks 32, 33 are mounted respectively, so that normal operation can be changed over as desired to reverse operation. The mechanism shown in FIG. 19 has these inlet and exhaust ports on the outer circumferential surface of outer casing so that a multicylinder compressor can be provided by arranging a plurality of this mechanism, in parallel.

According to this invention, a compressible or non-compressible fluid is delivered into airtight chambers defined by rotor, airtight rotor and blades, so that there is no danger of leakage of fluid. The provision of antifriction means between airtight rotor and outer casing minimizes frictional dragging at the time of rotation, so that the mechanism has a high mechanical efficiency at the time of pumping or operation. The mechanism which is reversible is capable of high output as well as effective supply and discharge of fluid.

Figure 20:
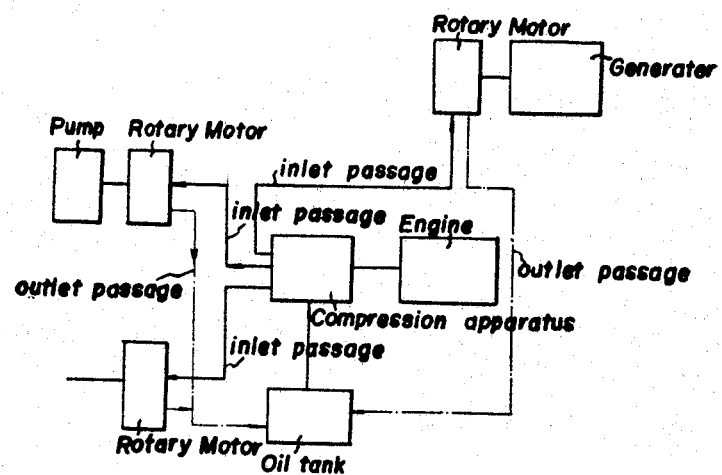
FIG. 20 shows an example of application of this invention.
Figure 39:
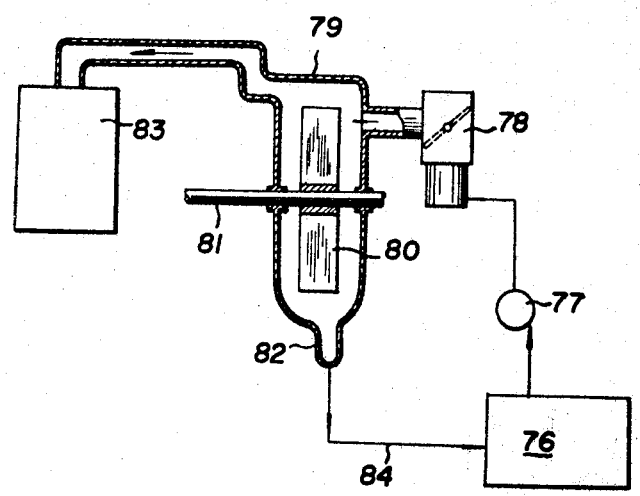
FIG. 39 is a diagrammatic view in explanation of a fuel revaporizing device according to this invention.

Various applications of this invention will now be explained. Since this invention provides a mechanism which develops power by using a compessible or non-compressible fluid, an engine may be used singly or in combination to develop power by means of aforementioned medium. For example, as shown in FIG. 20, a fluid may be delivered under pressure by means of a single compression device through several channels to a plurality of rotary motors which are adapted to serve as a power source for pumps, generators and the like. This obviates the necessity of positioning a great power source near where the power is required. This also makes it possible to develop a greater power by using the apparatus of a small size by increasing the pressure and flow rate of the medium. It is possible, therefore, to install a compression apparatus at a site selected as desired and at the same time to install a high power driving apparatus in a limited space.

This invention also provides a novel supporting mechanism for an airtight rotor, a novel mounting for blades, and a seal used in the above mechanisms. In FIG. 21A a cylindrical airtight rotor 4a is journalled at two points on the right and left by an antifriction supporting member 5 (hereafter to be referred to as a supporter) in the outer casing. 2 is a rotor. In order to cope with a thrust with respect to outer casing, shaft and the lateral surface of outer casing, a bearing portion 45 is provided in the projection formed in the rotary rotors 4a, 4b as shown in FIGS. 21B, 21C and 21D, and supporters 5, 5' are provided so that the circumferential surface and lateral surface may be journalled thereby. As the rotation of rotors increases its speed, the peripheral speed of airtight rotors 4a, 4b and 4c also increases. Lest the speed should surpass the allowable limit of antifriction means, another bearing portion 45 is provided on the lateral surface of airtight rotors 4b, 4c as shown in FIGS. 21C and 21D thereby maintaining airtight rotors 4b, 4c on the predetermined center line during rotation. In FIG. 21E is shown a mechanism in which a plate having an outer diameter eccentric to a hollow circle is inserted between airtight rotor and shaft which are journalled thereby, and antifriction means supporting rotor shaft are provided between said hollow portion and rotor shaft as well as between outer diametrical portion and the inner surface of the bearing portion of airtight rotor including thrust bearings in each direction.

Now the mechanism used for mounting blades in the airtight mechanism supported by aforementioned support mechanism will be explained.

In utilizing a high pressure medium, the pressure to which the blades are subjected is high as aforementioned no matter what the number of rotation of rotor may be. Thus the biasing force of springs or a centrifugal force may not be sufficient to hold blades against airtight rotors. According to the present invention, a sliding groove is provided on the lateral surface or inner surface of airtight rotors, each of the blades mounted on a roller through antifriction means and having a plate-like packing fitted in the groove formed in the front end thereof is maintained against the inner surface of airtight rotor by means of the biasing force of springs, and the change in clearance between the front end of a blade and airtight rotor to be caused by the rotational angle of rotor is elimated by the pressure of said packing and the back pressure of compressed medium applied to the packing, thereby positively holding the blades against airtight rotor.

This arrangement can minimize frictional dragging, which is not in the case with the arrangement above described in which contact is maintained with a surface. This arrangement also serves to incorporate the function of a labyrinth with better lubrication effect. The provision of a hole communicating with the groove for the purpose of applying back pressure to the undersurface of packing when applying pressure will increase the advantage of this arrangement. The blades guided by the groove formed in the rotor and sliding along the inner surface of the rotor, rotate concentric with the rotor, with the front ends of blades being held against airtight rotor at all times. The front ends of blades should be held against the inner surface of the rotor at all times, and should never be disengaged therefrom. If the mechanism is so arranged that the blades are urged toward the rotor merely by the biasing force of a spring or by a centrifugal force, the blades cannot positively be urged toward the rotor, when a high pressure or a shocking impact is applied. The biasing of blades toward the rotor at all times with a force which will be sufficient to withstand such a high pressure would shorten the life of blades. To obviate this disadvantage, this invention provides a novel mounting device for the blades.

Various modifications of this invention are shown in FIGS. 22A to 22C. In FIG. 22, a groove or a slit 41 is provided in the inner surface or the lateral surface of an airtight rotor in the direction of movement of blades for sliding blocks 42 to slide therein, each of these sliding blocks carrying a blade (not shown).

In FIG. 22B, a blade 6 is journalled sideways through a sliding block 47 by a concave supporting member 46 provided in the direction of movement of blades on the lateral surface of airtight rotor 4 carried by a supporting member 5 attached to the outer casing 1.

In FIG. 22C, a groove 40 is formed on the lateral surface of airtight rotor 4 in the direction of movement of blades for the rollers 49 to slide therein, each of said roller carrying the middle portion of a blade 6 which is provided with a packing in the front end thereof so that the blade may maintain close contact with the inner surface of airtight rotor 4.

In FIG. 22D, rollers 49 are fixed to the outer circumferential surface of airtight rotor 4 and a blade inside said rotor is carried by said rollers through seal plate 43.

FIG. 22E, a roller 49 is disposed on the outer circumferential surface of airtight rotor 4 and a blade 6 is carried by said roller through a spherical connecting member 36 and a packing 7 having a labyrinth on the contact surface thereof. This arrangement makes it possible to hold the front end of blades against the inner surface of airtight rotor at a predetermined angle, said angle lending itself to adjustment by means of the spherical connecting member 36 which facilitates deflection of a blade.

In FIG. 22F, a roller 49 is positioned in the T-shaped groove formed in the inner surface of airtight rotor 4 like the roller 49 of FIG. 22E, and a blade 6 is directly carried by this roller. A large number of packings are fitted to the front end of this blade 6, or the end portion of blade which keeps contact with the inner surface of airtight rotor 4. There may be provided at the back of this packing a vent hole 48 so that back pressure may be applied to said packing through said hole.

Thus, the arrangement as above described for carrying blades by proper means in such a manner that the front ends of said blades may be held against the inner surface of airtight rotor at all times enables the blades to be maintained against the airtight rotor without changing their positions, no matter what pressure or impact may be applied.

Figure 23:
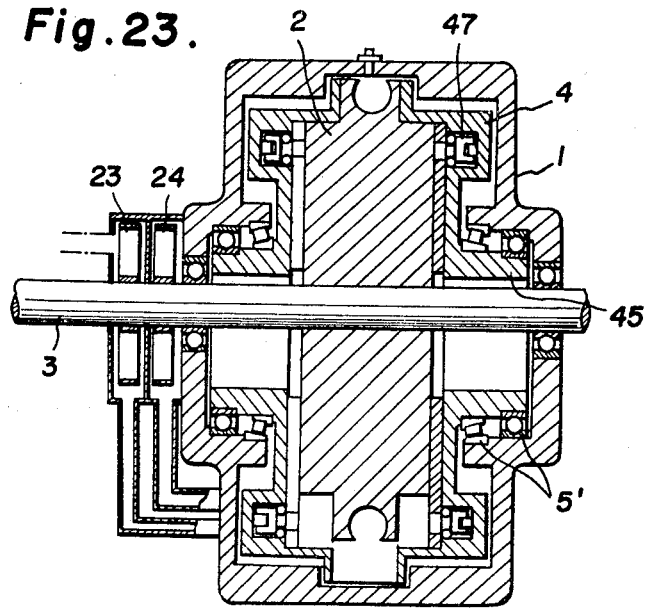
FIG. 23 is a diametric sectional view of an example of an internal combustion engine of the rotary blade type incorporating the supporting mechanism shown in FIG. 21 and the mounting device shown in FIG. 22.
Figure 24:
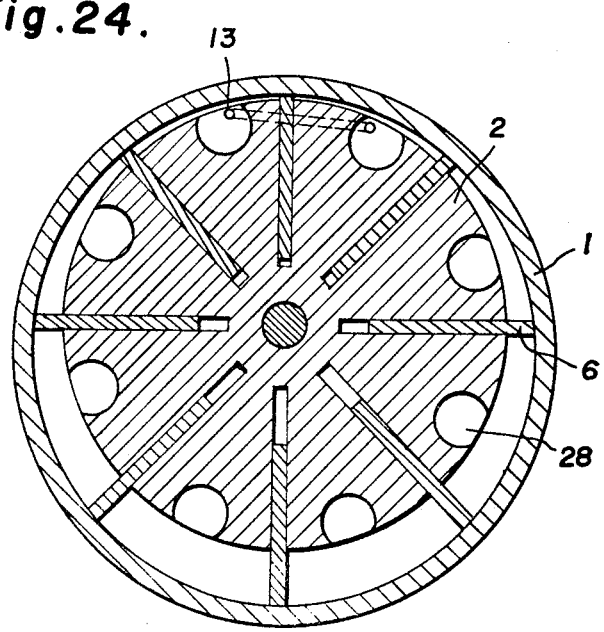
FIG. 24 is a view similar to FIG. 23 but in a diametric section.
Figure 25:
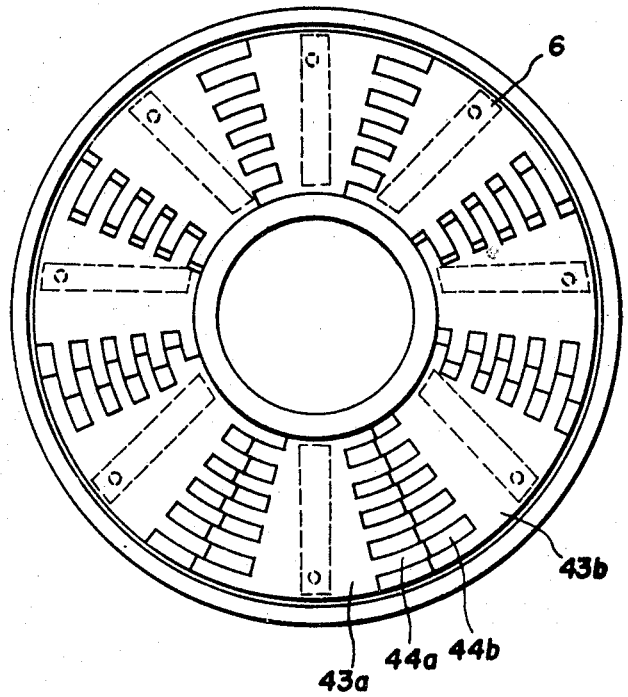
FIG. 25 is a view showing a seal mechanism of an example in which said mounting device is provided on the lateral side.

In FIGS. 23 and 24, there are illustrated internal combustion engines of the blade type in which the support mechanism and blade mounting device described hereinabove are incorporated. Mention must be made here of the problem of providing seal to the groove in which sliding blocks slide when the blade mounting device is used. How to seal this groove poses an important problem, especially in the case of internal combustion engines which are operated at high speeds, high pressures and high temperatures. In order to supply a satisfactory solution of this problem, this invention provides a sector seal plate as shown in FIG. 25 when the groove is provided on the lateral surface of airtight seal, said sector seal plate being made up of at least two portions 43a, 43b which are joined to one another by a concave member and a convex member 44a, 44b which mate with one another, said sector seal plate being capable of movement corresponding to the movement of a blade relative to airtight seal. Thus, the seal plate is held between blade and the lateral inner surface of airtight seal, keeping close contact with these two members, so that airtight seal for preventing the leakage of gas can be provided. When two seal plates, one overlying the other, are used, these two plates move in different directions relative to one another a distance corresponding to the movement of a blade with respect to the airtight rotor. This makes it necessary to arrange these two seals in such a manner that the joints of these plates may not overlap when said plates move as aforementioned.

The outer circumferential surface of a seal plate keeps close contact with the inner surface of cylindrical airtight seal, so that the provision of a labyrinth or a packing can prevent a trouble due to the peripheral speed. The inner circumferential surface, on the other hand, may well be constructed in such a manner that the leakage through the groove formed in the rotor as desired for mounting blades therein can be prevented.

Figure 26A:
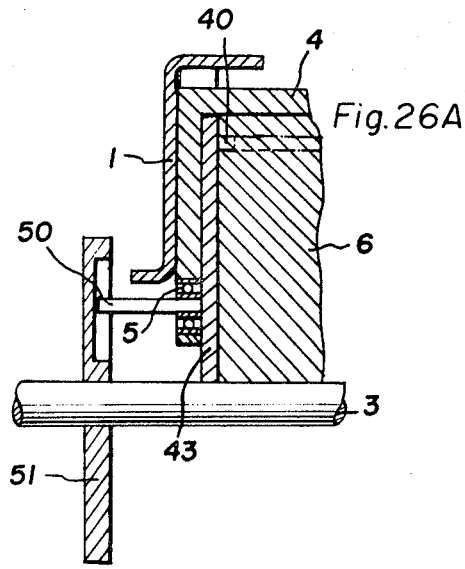
FIGS. 26A and 26B are fragmentary sectional view of a camming device adapted to bring blades into predetermined positions in the airtight rotor and a plan view of the cam, respectively.

The seal plate 43 may be used for mounting blades as shown in FIG. 26a in which the seal plate 43 has a shaft 40 fixed to the upper part thereof for engaging a blade 6, said seal plate also having on the opposite side thereof another shaft 50 which maintains contact with airtight rotor 4 through antifriction means 5. If the mechanism is arranged such that a shaft 50 keeping contact with the airtight rotor of a mounting device fixed to the lateral surface of said rotor is extended, and a cam associated with said shaft 50 is mounted on the rotor shaft 3 for driving the front ends of blades 6 through shaft 50 so that the front ends of blades may be positioned at all times in the extension of a groove in the rotor, it is possible to bring the front ends of blades, to a predetermined position by means of this cam, thereby preventing the trouble of having the grooves in the rotor forcedly opened.

Figure 26B:
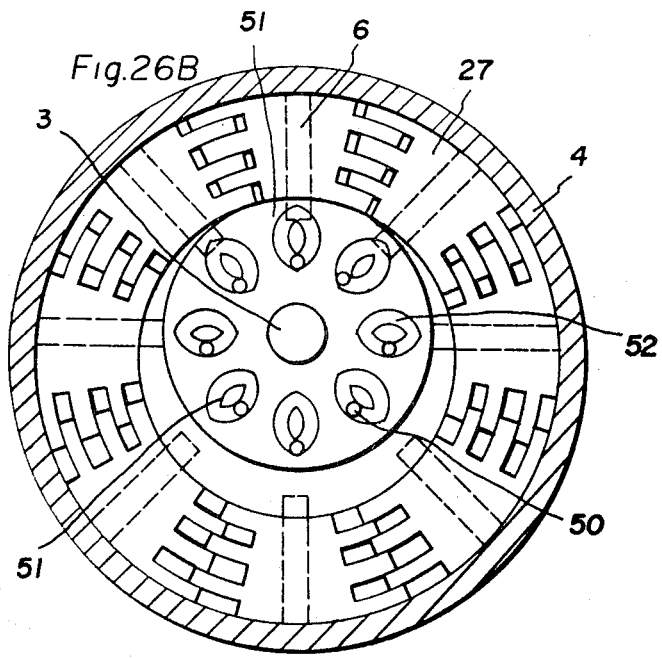

In FIG. 26b, a cam 51 is shown, with a mounting shaft 50 being inserted in a cam slot 52 formed approximately in the shape of a letter O. The shaft 50 for mounting each blade 6 occupies a position shown in FIG. 26b in the cam slot 52 corresponding to the eccentricity of airtight rotor 4 relative to rotor shaft.

Figure 27:
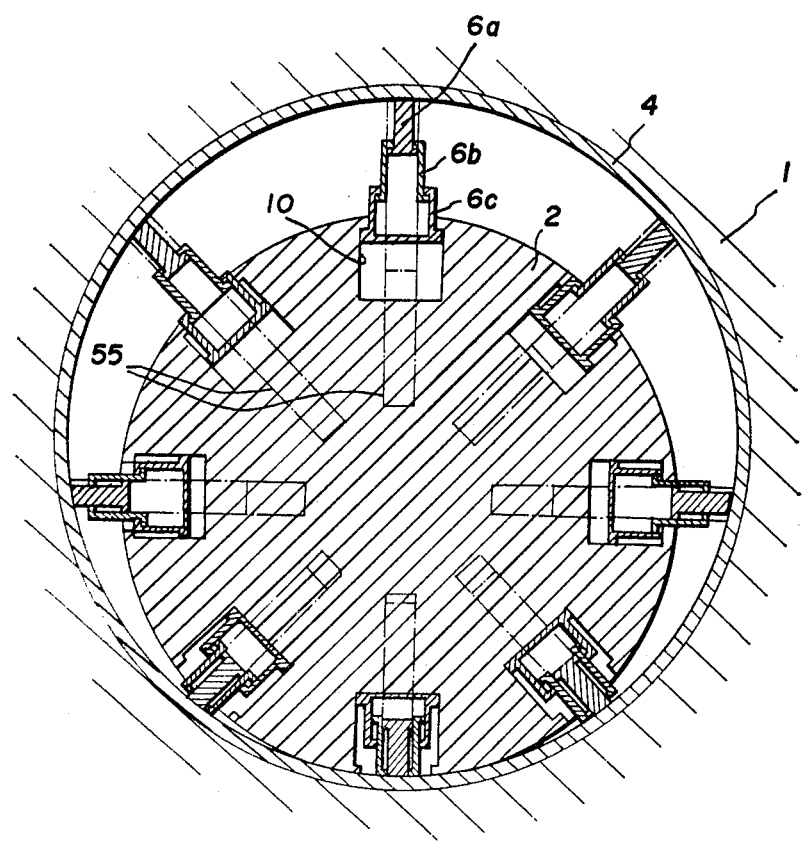
FIG. 27 is a view in diametric section of a rotary machine of the blade type provided with blades according to this invention.

In the present invention, the radial grooves formed in the rotor for positioning blades therein are made as shallow as possible or are entirely eliminated so that the trouble due to the grooves being deep, such as the lowering of the strength of rotor against a centrifugal force, the reduction of compression ratio, the limits to be imposed on the dimension of a blade, etc. may be prevented. This arrangement will be explained with reference to the drawing. In FIG. 27, 1 is an outer casing, and 2 is a rotor. To the rotor 2 are mounted telescoping blades 6 which are formed in more than two sections 6a, 6b, 6c or more of the whole length of a blade being contained in said groove. Consequently, each of the blades is telescoped and positioned in the groove in accordance with the length of a clearance between rotor 2 and outer casing 1, the sections of said blade slide into one another and the blade is housed entirely in the groove when rotor 2 and outer casing 1 keep close contact with one aonther and there is no clearance therebetween. 55 is a groove for a blade to slide in as in the rotary machine of the conventional type.

Figure 28A:
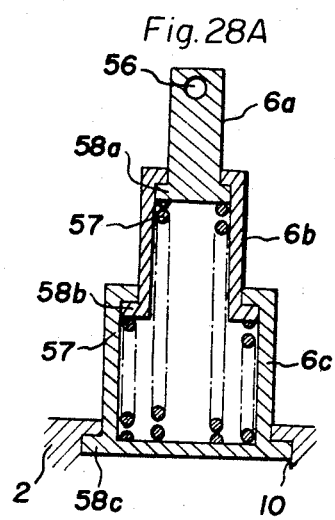
FIGS. 28A to 28C are views in section of various examples of the structure of a blade.
Figure 28B:
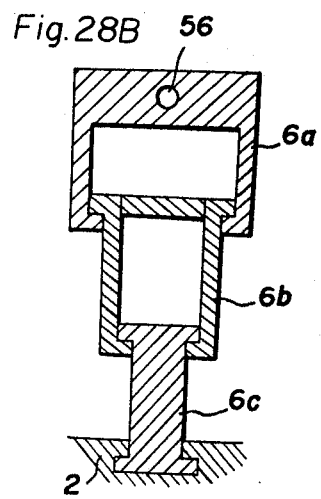
Figure 28C:
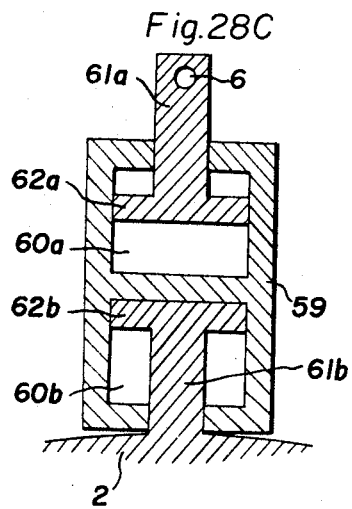
Figure 29:
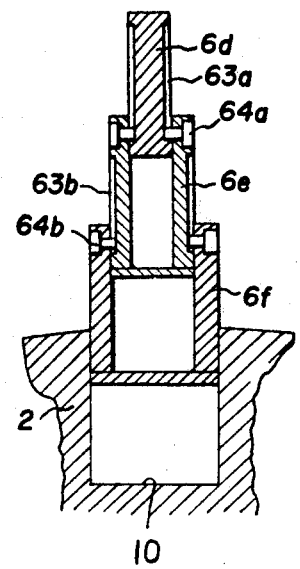
FIG. 29 is a view in section of another example of the structure of a blade.
Figure 30:
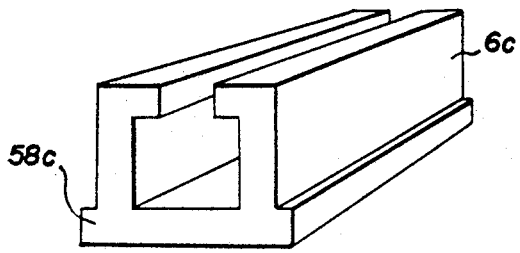
FIG. 30 is a perspective view of the lowermost member of the blade shown in FIG. 28A.
Figure 32:
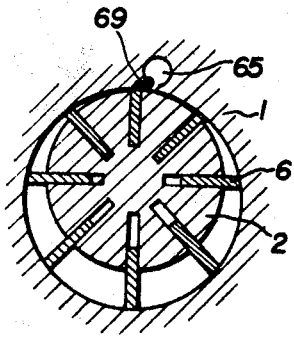
FIG. 32 is a view in diametric section of an internal combustion engine of the rotary blade type provided with the aforementioned self-ignition device.

This telescoping blade may be constructed in several forms. Some of the forms are shown in FIGS. 28 and 29. The form shown in FIG. 28A has the same construction as that shown in FIG. 27. In this instance, a blade is formed in three sections, each section engaging one another so that the blade may be telescoped. The section 6c which is the lowermost member of this blade assembly is hollow in the inside and has open ends as shown in FIG. 30. The member 6c also has edges 58c, 58c projecting from the opposite ends of its floor and adapted to engage, as shown in the drawing, the opening formed in the groove 10 provided in the rotor 2. In ths hollow lowermost member 6c is slidably inserted an intermediate member 6d which also has edges 58b, 58b in the lower end for engaging the opening of the member 6c. In this hollow intermediate member 6b is inserted the uppermost member 6a which also has edges 58a, 58a in the lower end for engaging the opening of the member 6b.

If it is required to do so, a spring 57 may be mounted, as illustrated, in the blade assembly so that blade members 6a, 6b and 6c may be biased in the radial direction to eliminate friction. In the blade assembly shown in FIG. 28b, the arrangment of blade members is reversed as compared with the arrangement shown in FIG. 28A for mounting the assembly on the rotor 2. The blade assembly shown in FIG. 28C is so arranged that hollow spaces 60a, 60b are provided in the upper and lower parts of a box-like member 59, with a T-shaped blade member 61b having a portion 62b projecting from the rotor 2 and an inverted T-shaped blade member 61a having a portion 62a are slidably inserted in the lower and upper hollow spaces respectively. The blade assembly shown in FIG. 29 is also formed in several sections capable of sliding one into the other, the blade members 6d, 6e and 6b being arranged to engage one another by means of bolts 64a, 64b and guide grooves 63a, 63b. When the members of this blade assembly have been forced one into the other, the assembly is housed in its entirety in the groove 10 formed in the rotor 2. 56 is a hole associated with the mechanism for mounting this blade assembly.

The structure provided by this invention is so arranged, as above described, that the grooves 10 formed in the rotor 2 are much shallower than the grooves of the conventional type. This arrangement makes the grooves of this invention spaced apart from one another a larger distance, and the space between grooves is much thicker than in the grooves of the conventional type, so that increased strength is assured. Coupled with the decreased weight of blade itself, this makes the mechanism provided by this invention far superior to the mechanism of conventional type.

This invention provides a self-ignition device which relies on residual flames that have been ignited previously for reignition and which is adapted for use with an internal combustion engine of the rotary blade type which is provided with an airtight rotor divided into the left and right portions, each having a side wall.

Figure 31:
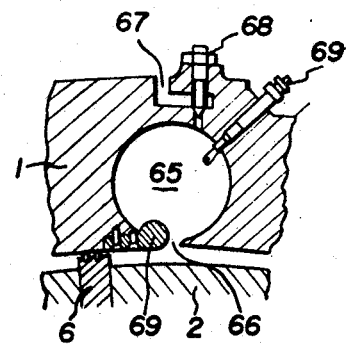
FIG. 31 is an enlarged sectional view of the essential part of self-ignition device provided by this invention.

In FIG. 31, there is provided a recess 65 in one part of the outer casing 1, or at a position where ignition takes place. The recess 65 communicates through an opening 66 with a combustion chamber surrounded by the outer circumferential surface of a rotor. The recess also communicates through a small opening 67 with atmosphere, said opening 67 having a needle valve 68 mounted therein. A glow plug 69 is provided in the recess 65, while a burnt metal 69' is secured to a part of the opening 66 formed in the recess 65, 6 is a blade.

In operation, needle valve 68 provided in the recess 65 is opened and the glow plug 69 is supplied with power so that it may become red-hot. Then, the engine is started, with an air fuel mixture having an air fuel ratio suitable for ignition by means of diesel injection or a carbureter being suctioned into the engine. Consequently, the mixture is delivered to the recess 65 under pressure after being suctioned, and when a part of this suctioned mixture is discharged through small opening 67 it comes into contact with the red-hot glow plug to be ignited. A part of this ignited mixture is vented to atmosphere but the greater part is injected into a combustion chamber in flames, thereby positively igniting the mixture in the combustion chamber. The mixture thus ignited is expanded and causes rotor 2 to rotate. Aforementioned recess 65, being formed in the outer casing 1, has nothing to do with the rotation of rotor, so that the combustion is carried on without obstruction.

When the recess 65 has been heated uniformly throughout and it is no longer necessary to use a glow plug, the supply of power is topped and said needle valve 68 is closed so that the recess 65 may be independent of other elements. When the recess is in this state, the burnt metal 69' provided in the opening of recess 65 becomes red-hot due to the burning mixture, so that the mixture led into the recess comes into contact with this burnt metal to ignited.

Thus, the recess 65, when its communication with atmosphere is suspended and the plug provided therein is no longer supplied with power, injects flames into the combustion chamber when the former is indexed with the latter, with the flames thus ignited spreading all the way along the surface of rotor and gradually moving through the center of the combustion chamber in the direction of rotation. Assuming that we are dealing with Sabathe cycle, there will arise a difference of $P_2 - P_1$ in the pressure between recess and combustion chamber when the flames are injected from the former into the latter.

Since the recess is intended for storing the energy necessary for ignition, it is designed such that its volume is small and injection ceases when nearly all the mixture in the combustion chamber has been ignited. When injection thus ceases after the mixture in combustion chamber has been ignited, the pressure in the recess is lowered, growing lower than the pressure in the combustion chamber due to the injection energy working to further this tendency. The mixture ignited under such conditions in the combustion chamber increases its pressure spontaneously, the mixture burning in flames expanding in all directions. Since the pressure in the recess is lower than the pressure prevailing in the combustion chamber, the mixture in flames spreads also to the recess.

The mixture thus invading the recess swirls according to the configuration of the recess, thereby promoting combustion and increasing pressure in the recess. The recess is maintained in this state till it indexes with the next following combustion chamber. When the former is indexed with the latter, the process described hereinabove is repeated.

As will be understood from the above description, this invention provides means whereby the spreading and expanding force spontaneously developed during the combustion of a mixture can be applied to the recess 65. After a combustion chamber has ceased to be aligned with the recess, the combustion is carried on without any trouble. The burning mixture, which is led into the recess due to the pressure therein being lowered, swirls and mixes with the mixture therein according to the configuration of the recess, so that the combustion takes place earlier in the recess than in the combustion chamber. This makes the ignition energy applied to the next following combustion chamber that is indexed with the recess great and positive, with the adherence of carbon being minimized. The provision of a burnt metal 69' in the opening of recess 65 which is heated sufficiently promotes the ignition of mixture that comes into contact therewith, helping simultaneously the ignition of unburnt mixture. It will be seen from the above description that the ignition device provided by this invention is unique in that, except for the time of actuation, ignition can be carried out automatically and spontaneously without any trouble. Further advantage of this device is that it is simple in construction and easy to manufacture.

This invention provides a novel actuation chamber of unique form which is defined by an eccentric rotor and an outer casing or an airtight rotor and blades, so that the efficiency at which the fluid is suctioned can be increased when the principles of this invention are applied to machines using a compressible fluid as a medium and the combustion can be carried out satisfactorily when the principles of this invention are applied to internal combustion engines.

The invention will be explained with reference to the drawing. In the machine of the rotary blade type shown in FIG. 33, the surfaces of rotor and outer casing which are positioned against one another are flat, so that the rotor and outer casing come into contact with one another at one point when actuation chamber is compressed. Since the rotor and outer casing move away from one another as a blade moves away from the point of contact, a clearance shown in the drawing as the hatched area is formed on both sides with only the point of contact being formed in the center. This causes a trouble when a compressible fluid is delivered under pressure of an air fuel mixture is burned in a combustion chamber.

In order to obviate the aforementioned fault, this invention contemplates the provision of convex and concave surfaces in the rotor and outer casing or airtight rotor so that the compressible fluid may be swirled in the space defined by these curved surfaces. In FIGS. 34 and 35, a rotor 2 is mounted inside an outer casing 1, and a number of blades 6 which are disposed radially are carried by the the rotor 2. Said rotor 2 is eccentric to the outer casing 1 in which it is mounted. There is provided an airtight rotor 4 which keeps close contact with the outer casing 1 through antifriction means 5. Rotor 2 has an outer circumferential surface of the convex form.

If necessary, recesses 71 are formed in the rotor such that each of said recesses is disposed between blades. Outer casing 1 and airtight rotor 4 have an inner circumferential surface 72 which is concave in form in contrast to the aforementioned convex outer circumferential surface of rotor 2, so that a space having curved surfaces is defined. Accordingly, each of the blades mounted inside the groove 1 formed in the rotor 2 radially is formed to provide a front end which is so shaped that it keeps close contact with the inner circumferential surface of outer casing 1. As shown in FIG. 36, a blade is formed to provide a convex surface in the front end thereof, with several transverse grooves 74 being formed in said end substantially at right angles to the direction in which the tip of blade slides. Packings 75, 75' illustrated in FIGS. 37A and 37B are mounted in said grooves in order to provide airtight seal in the sliding surface of the front end of a blade.

In operation, the air or the air fuel mixture suctioned into the internal combustion engine shown in FIGS. 34 and 35 is gradually compressed as rotor 2 rotates, with the convex surface 70 of rotor being brought into engagement with the concave surface 72 of outer casing 1 and airtight rotor 4. The air or the air fuel mixture contained in a space between the portions which draw near sooner than other portions is led into a space between other portions because the pressure in the former becomes higher, thereby creating the flow of air at the time of compression. As the medium is gradually compressed, the pressure in general is raised. Disequilibrium in the mode of approach to one another of outer casing and airtight rotor due to the difference in shape, however, causes the compressed medium to move to a recess 71. When the actuation chamber has been minimized in space, strong whirls are developed at the opposite end of rotor 2 or the blades by which said space is straddled, and find their way into the recess 71 between the blades, so that an air or an air fuel mixture used as a medium is agitated and develops a heat of compression, thereby creating a condition most favorable for ignition and combustion.

The supply under pressure of a compressible fluid will now be explained. The greatest loss ever experienced in the introduction of a compressible fluid under pressure into machines has been caused by the expansion that takes place when the fluid is led into machines. In principle, engines of the rotary blade type provide a turning force at static pressure. In view of this, it is necessary in obtaining satisfactory performance of the engine that the fluid may develop as little power as possible in the inlet port. Consequently, the creation of a space shown in FIG. 33 as a hatched area is most objectionable. The recess 71 formed in the outer circumferential surface of rotor 2 according to this invention makes it possible to collect incoming fluid in this recess, without letting it be dispersed when it is delivered to the machine, so that the pressure delivered from the recess 71 may be applied to every corner of the actuation chamber when the inlet port is closed, thereby minimizing the loss encountered in introducing a fluid into the machine. The elimination of this loss is an advantage provided by this invention.

Another advantage provided by this invention is that blades are not subjected to an impact of high pressure when the air is exploded as in engines of the conventional type, so that the deformation of blades which is liable to cause leakage of air and damage to blades can be prevented. FIG. 38 is a fragmentary perspective view of a rotor provided by this invention.

Lastly, the present invention provides a device which enables to revaporize the fuel vaporized by carburetor so that a complete air fuel mixture may be delivered to the internal combustion engine.

In FIG. 36, 76 is a fuel tank from which fuel is delivered through a pump 77 to an air fuel mixing device 78 such as a carbureter. Between this air fuel mixing device 78 and an internal combustion engine of the rotary blade type is positioned a compression device 79 which has a fan 80 rotatably carried by a shaft 81. The shaft 81 is driven through an associated mechanism by an exhaust gas turbine or an engine. There is provided on the floor of the device 79 a reservoir 82 which is connected with fuel tank 76 through pipe 84.

In operation, the vaporized particles coming out of air fuel mixing device 78 when air is delivered during the suction stroke are caused to pass through the rotating blades of fan 80 so that smaller particles may be accelerated together with the air to be delivered to the cylinder. Relatively larger particles, on the other hand, are struck by the rotating blades of fan 80 and atomized or adhere to the blades.

The revaporized fuel which has been struck by blades and has been atomized is delivered to the cylinder together with said air. The fuel that has adhered to the blades comes into contact with air that passes along said blades and is vaporized by depriving the air of a latent heat of evaporation to be finally introduced into the cylinder.

The fuel which is not subjected to this vaporization action (larger particles) is spread in the radial direction by the centrifugal force of blades and get adhered to the side walls of compression device 79, falling along the walls while being vaporized into the reservoir 82 below. The fuel that has been collected in the reservoir is returned immediately to the fuel tank 76 through pipe 84.

Thus, this invention provides means whereby the fuel vaporized by an air fuel mixing device is revaporized by means of a compression device and forcedly delivered to the cylinder. On the other hand, the fuel vaporized deprives the air of a latent heat of evaporation and cools the air, so that the rise in temperature due to the operation of a compression device can be prevented, thereby increasing the efficiency at which the medium is suctioned into the engine. The medium that is delivered to the engine as a complete mixture of air and fuel contributes to better performance of engine. The device provided by this invention contributes to the reduction of fuel cost, for that portion of fuel which has not been vaporized is separated by the fan disposed in the compression device and returned to the fuel tank for further use. The liquefied gas fuel has a redoubled effect when used with a machine provided with this device.

While preferred embodiments of this invention have been shown and described, it will be understood that the particular details herein set forth are capable of modification and variation without departing from the principles of the invention and that the scope of the invention should be limited only by the scope and proper interpretation of the claims appended thereto.

What is claimed is:

1. A rotary machine of the blade type wherein a plurality of blades are mounted on rotor means which is eccentrically and rotatably mounted in a stationary outer casing, and working chambers, undergoing periodic changes in volume as the rotor means rotates, characterized by an air tight rotor having a circumferential wall extending around the radially outer ends of said blades, said rotor being rotatably mounted in and concentric with said outer casing; anti-friction means disposed between said air tight rotor and said outer casing; said radially outer ends of said blades maintaining close contact with the circumferential wall of said air tight rotor; said rotor having at least one diametrically extending side wall engaged with said rotor means; said working chambers being defined by said rotor means, said air tight rotor and said outer casing.

2. A rotary machine of the blade type, as claimed in claim 1, wherein said air tight rotor is divided along a diametric plane into a pair of separate rotor sections each having a diametrically extending side wall and each mounted concentrically within said outer casing; each rotor section maintaining close contact with said rotor means in a manner such that said rotor sections embrace respective opposite ends of said rotor means.

3. A rotary machine of the blade type wherein rotor means, eccentric to a stationary outer casing, is rotatably mounted in said outer casing, blades are slidably mounted in radial grooves in said rotor means so that working chambers may undergo periodic changes in volume as said rotor means rotates, and an air tight rotor is mounted concentrically within said outer casing and divided, along a diametric plane, into rotor sections each concentric with said outer casing, said sections maintaining close contact with said rotor means in a manner such that the two rotor sections embrace respective opposite ends of said rotor means, each of said rotor sections having a radial side wall, and anti-friction means disposed between said air tight rotor and said outer casing; and wherein combustion chambers spaced from one another with a predetermined distance are provided in a rotor or the outer casing at positions where said rotor and said outer casing are opposed to each other, and each of the blades is provided with a packing band at the radially outer end thereof which keeps contact with the air tight rotor and a labyrinth at the radially outer end thereof which keeps contact with the outer casing.

4. A rotary machine of the blade type, as claimed in claim 1, wherein a suitable inlet port and an exhaust port are provided in the wall of said outer casing depending on whether the medium used is a compressible fluid or a non-compressible fluid, and said medium is introduced into the machine through this inlet port and discharged from said machine through said exhaust port, thereby developing power, delivering fluid, or applying pressure.

5. A rotary machine of the blade type wherein rotor means eccentric to a stationary outer casing is mounted in said outer casing, blades are slidably mounted in grooves forming radially in said rotor means so that working chambers may undergo periodic changes in volume as a rotor shaft rotates, an air tight rotor concentric with said outer casing, anti-friction means rotatably mounting said rotor in said outer casing, said air tight rotor being pail-shaped and having a diametrically extending side surface, a cylindrical bearing portion provided in said air tight rotor, and a thrust bearing portion and at least two anti-friction bearing portions are provided.

6. A rotary machine of the blade type, as defined in claim 5, wherein there is provided a mounting device maintaining said blades in close contact with said air tight rotor so that they smoothly and oscillatingly slide along said air tight rotor.

7. A rotary machine of the blade type, as defined in claim 5, wherein a groove is formed in the inner wall surface of said air tight rotor, and anti-friction means mounting said blades in said grooves so that said blades may slide oscillatingly along the inner surface of said air tight rotor.

8. A rotary machine of the blade type, as defined in claim 5, wherein a groove is formed in the inner wall surface of said air tight rotor, pins mounting said blades in this groove, anti-friction means engaged with said pins, whereby said blades may oscillatingly slide along the inner surface of said air tight rotor, and seal plates sealing said groove.

9. A rotary machine of the blade type, as defined in claim 8, including a mounting pin disposed between each blade and said seal plate and a mounting pin is disposed between said seal plate and groove, said pins being positioned on different lines.

10. A rotary machine of the blade type, as defined in claim 8, wherein there is provided a cam engaging said pins and actuated by the rotation of the machine, said cam bringing each of the blades to a predetermined position in the circumferential direction in the air tight rotor.

11. A rotary machine of the blade type wherein a rotor means eccentric to a stationary outer casing is rotatably mounted in said outer casing, blades are slidably mounted in grooves formed radially in said rotor means so that working chambers may undergo periodic changes in volume as a rotor shaft rotates, an air tight rotor concentric with said outer casing, anti-friction means rotatably mounting said air tight rotor in said outer casing, said air tight rotor being pail-shaped and having a diametric side surface, said blades comprising blade assemblies mounted in said rotor means, each of said blade assemblies comprising a plurality of members slidably engaging each other.

12. A rotary machine of the blade type, as claimed in claim 11, in which said air tight rotor is divided along a diametric plane into two rotor sections each including a diametric side wall, said diametric side walls being adjacent respective opposite ends of said rotor means.

13. A internal combustion engine of the rotary blade type wherein a rotor means eccentric to a stationary outer casing is rotatably mounted in said outer casing, blades are slidably mounted in grooves formed radially in said rotor means so that working chambers may undergo a periodic change in volume as a rotor shaft rotates, an air tight rotor concentric with said outer casing, anti-friction means rotatably mounting said air tight rotor in said outer casing, said air tight rotor being divided along a diametric plane into two rotor portions, each portion having a diametric side wall surface, and a recess being formed in one part of the outer casing so that a burning gas may be stored therein to promote combustion, said recess injecting said burnt gas into a working chamber when the former is brought into index with the latter thereby igniting an air fuel mixture and assisting the combustion of said mixture in said working chamber.

14. An internal combustion engine of the rotary blade type, as defined in claim 13, wherein there is provided in the opening of said recess a burnt metal which is adapted to be heated by the incoming and out flowing burning gas.

15. A rotary machine of the blade type wherein a plurality of blades are mounted on a rotor means eccentrically mounted for rotation in a stationary outer casing, and working chambers undergo periodic changes in volume as said rotor means rotates, an air tight rotor concentric with said outer casing, anti-friction means rotatably mounting said air tight rotor in said outer casing, said air tight rotor being divided along a diametric plane into two rotor portions, each portion having a diameteric side wall surface, said rotor means having an axially convex circumferential surface, said rotor having an axially concave inner circumferential surface facing said convex surface, said convex circumferential surface of said rotor means having a recess extending inwardly therefrom.

16. An internal combustion engine of the rotary blade type wherein a rotor means eccentric to a stationary outer casing is rotatably mounted in said outer casing, blades are slidably mounted in grooves formed radially in said rotor means so that working chambers may undergo periodic changes in volume as a rotor shaft rotates, an air tight rotor concentric with said outer casing, anti-friction means rotatably mounting said air tight rotor in said outer casing, said air tight rotor being pail-shaped and having a diametric side wall surface, a compression device having a fan is provided in the fuel inlet passage between the engine and a carburetor, and the fuel vaporized in the carburetor is arranged to pass through the blades of this fan so that fuels in relatively large particles may be revaporized.

17. An internal combustion engine, as claimed in claim 16, in which said air tight rotor is divided along a diametric plane into two rotor portions, each portion having a diametric side wall surface.

18. A rotary machine of the blade type, as claimed in claim 1, including a bypass in said outer casing connecting two working chambers.

19. A rotary machine of the blade type wherein a plurality of blades are mounted on a rotor means eccentrically mounted for rotation in a stationary outer casing, and working chambers undergo periodic changes in volume as said rotor means rotates, an air tight rotor concentric with said outer casing, anti-friction means rotatably mounting said air tight rotor in said outer casing, said air tight rotor being divided along a diametric plane into two rotor portions, each portion having a diametric side wall surface, said rotor means having an axially convex circumferential surface, and said rotor having an axially concave inner circumferential surface facing said convex surface.

References Cited

UNITED STATES PATENTS 813,018  2/1906  Okun.

FOREIGN PATENTS 964,108  7/1964  Great Britain.

C. J. HUSAR, *Primary Examiner.*

U.S. Cl. X.R.

123—8, 141, 143; 91—73; 103—121; 230—146